Aug. 28, 1934.    R. PAXTON    1,971,832
ELECTRICAL SWITCH GEAR
Original Filed Jan. 14, 1933    2 Sheets-Sheet 2

Inventor:
Robert Paxton,
by Harry E. Dunham
His Attorney.

Patented Aug. 28, 1934

1,971,832

UNITED STATES PATENT OFFICE 1,971,832

ELECTRICAL SWITCH GEAR

Robert Paxton, Lansdowne, Pa., assignor to General Electric Company, a corporation of New York Original application January 14, 1933, Serial No. 651,838. Divided and this application August 25, 1933, Serial No. 686,759

10 Claims. (Cl. 200—5)

My invention relates to electrical switch gear, more particularly to transfer or selector switching means for a bus and switch station.

In a bus and switch station, as a metal clad station for example, it is often desirable to transfer the feeder circuit from a main to a transfer bus and to take the feeder circuit breaker and voltage regulator out of service for inspection or repair without interrupting the continuity of feeder service.

This operation has previously been performed in various ways as by the use of a double throw transfer breaker and a feeder breaker or two separately operated disconnecting switches and a feeder breaker.

The principal object of my invention is the provision of improved selector switch means for electrical switch gear of the aforesaid character.

This application is a division of my application Serial No. 651,838, filed January 14, 1933, for Electrical switch gear.

My invention will be more fully set forth in the following description referring to the accompanying drawings, and the features of novelty which characterize my invention will be pointed out with particularity in the claims annexed to and forming a part of this specification.

Figure 1:
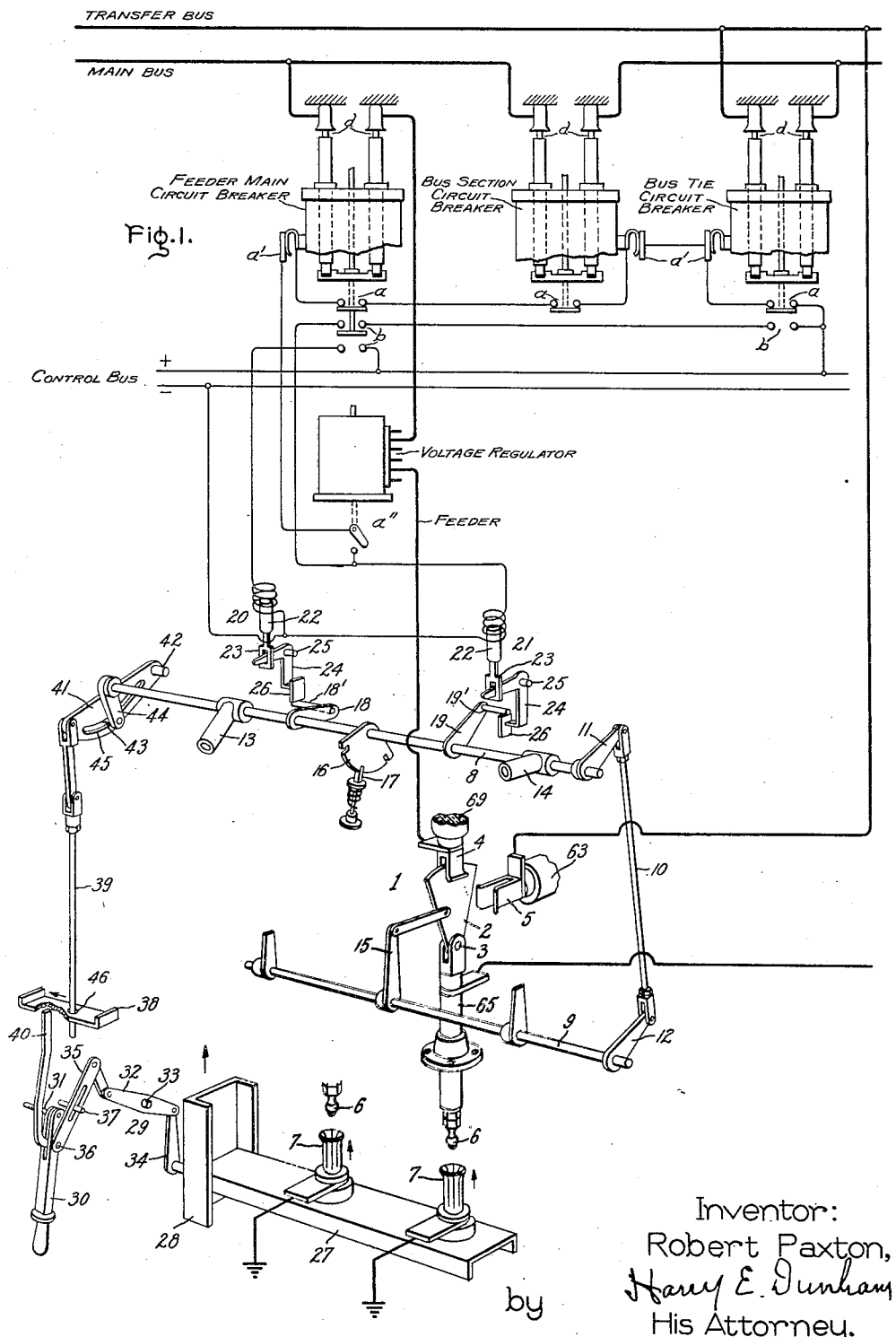
Figure 2:
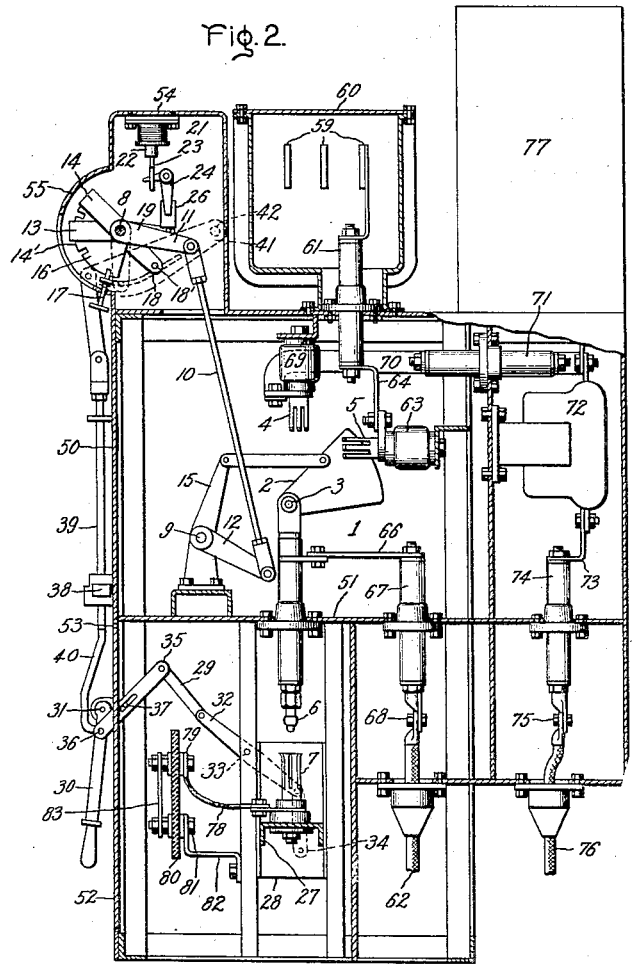
Figure 3:
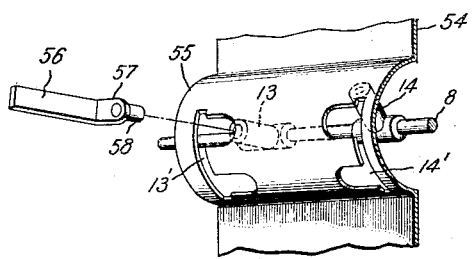

Referring to the drawings, Fig. 1 is a partly diagrammatic illustration of a bus and switch station embodying my invention; Fig. 2 is an elevational view, partly in section, of a selector switch transfer bus unit for a metal clad bus and switch station; and Fig. 3 is a fragmentary detailed view of structure shown in Fig. 2.

Referring to Fig. 1, there is illustrated partly diagrammatically a bus and switch station, including a main bus having a bus section circuit breaker, a transfer bus connected to the main bus through a bus-tie circuit breaker, and a feeder connection arranged normally to be energized from the main bus through the main feeder circuit breaker and a voltage regulator. The circuit breakers are each shown as of the well known oil type having a vertically movable circuit interrupting bridging member and plug and socket disconnecting contacts arranged to operate in response to bodily vertical movement of the circuit breaker.

In practice, it may be necessary to transfer the feeder circuit from the main bus to the transfer bus for the purpose of taking the main feeder oil circuit breaker and voltage regulator out of service for inspection or repair, while maintaining continuity of feeder service. It will be noted that the main feeder oil circuit breaker and the voltage regulator are both dead in so far as the main bus and feeder are concerned, when the feeder is no longer connected to the voltage regulator and the conventional plug and socket disconnecting contacts of the main feeder oil circuit breaker are separated. It may also be necessary to disconnect the feeder from the main or transfer bus and to ground the same. In performing the above operations, it is of course necessary that certain conditions as hereinafter described be fulfilled in order to prevent arcing at the transfer means and other undesirable operating conditions.

For the purpose of effecting proper and predetermined order of transfer of the feeder with respect to other related apparatus in the bus and switch station, there is provided transfer or selector switching means generally indicated at 1. In order to simplify and clarify the description relating to the cooperation in the system of the selector switching means including the interlocking mechanism therefor, the actuating and interlocking means are illustrated independently of the structural switching unit in which this apparatus is generally incorporated in practice.

The selector switching means comprises a selector switch member 2 pivotally mounted as at 3 for rotative movement. The member 2 comprises a sector-shaped conductor which is electrically connected to the feeder and is arranged selectively to engage and bridge the stationary clip contacts 4 and 5 comprising the contact connections to the voltage regulator and transfer bus respectively. The feeder is likewise directly connected to a contact 6 which together with a movable coacting ground switch contact 7 comprises a grounding connection for the feeder. The present illustration includes but a single phase layout, it being of course understood that the well known polyphase arrangement is contemplated.

For the purpose of effecting the aforesaid predetermined order of operation there is provided operating and interlocking means for the selector switch which are controlled in accordance with the operating positions of the voltage regulator and oil circuit breakers. The operating mechanism for the selector switch member 2 comprises a main operating shaft 8 and a counter-shaft 9 which are suitably interconnected, as by rod 10 connected to the arms 11 and 12 secured to the shafts 8 and 9 respectively. The main shaft 8 is actuated by means of operating arms 13 and 14 which are secured to the shaft 8 and angularly spaced with respect to each other for a purpose hereinafter described. Rotative movement is transmitted from the countershaft 9 to the selector switch member 2 as by a toggle linkage 15. It will therefore be clear that rotation of the main shaft 8 is effective to rotate the selector switch member 2 so as selectively to engage and bridge the coacting stationary contacts 4 and 5, and also to move the selector switch in the opposite direction to its open position.

In order more accurately to position the selector switch in the open, main bus, and transfer bus positions, there is secured to the shaft 8 a member 16 having three positioning notches along the periphery thereof for coacting with a locking plunger 17 which is resiliently biased into engagement with the member 16.

The interlocking means for controlling operation of the shaft 8 comprises a pair of arms 18 and 19 secured to the shaft 8 and angularly spaced with respect to each other. The arms 18 and 19 coact with a pair of magnetic locks 20 and 21 respectively, each lock, as lock 20, comprising a solenoid controlled plunger 22 arranged to connect loosely, as at 23, with one arm of a crank 24 serving as a blocking member for the arm 18. The blocking crank 24 is pivoted as at 25 and is provided with an offset lug 26 which is, in the deenergized position of the magnetic lock, in the path of a pin 18' secured to the arm 18. Energization of a magnetic lock is effective to raise the corresponding plunger and rotate the blocking crank 24 clockwise as viewed so that the lug 26 is out of the path of the corresponding pin. In the position shown both magnetic locks are deenergized, the arm 18 being blocked with respect to counter-clockwise rotation and the arm 19 blocked with respect to clockwise rotation, so that rotation of the shaft is precluded and the selector switch is locked in the regulator or main bus position shown. Energization of the magnetic locks is controlled in accordance with the operating positions of the voltage regulator and oil circuit breakers in a manner hereinafter described.

The controlling and interlocking means for the selector switch comprises an arrangement for preventing other than a predetermined order of rotation of the selector switch member 2. For example, the prerequisites for operation of the selector switch from the regulator or main bus position as shown, for example, to the transfer bus position when the feeder is energized are:

(a) The voltage regulator in its neutral position.

(b) The transfer bus or bus-tie oil circuit breaker closed and in its elevated operating position.

(c) The bus section oil circuit breaker closed and in its elevated operating position.

(d) The feeder main oil circuit breaker closed and in its elevated operating position.

It will be noted that the above conditions not only provide proper circuit breaker protection, but preclude arcing or spitting at the selector switch contacts during transfer of the feeder circuit under load.

The same requirements are likewise to be observed in transfer of the feeder from the transfer bus back to the regulator position. Furthermore, the arrangement is such that the feeder cannot be grounded unless (a) the feeder main oil circuit breaker is open and (b) the selector switch is in its open position. The feeder, when deenergized, may be transferred from the regulator position to the transfer bus position by the selector switch when (a) the feeder main oil circuit breaker is open and (b) the bus-tie oil circuit breaker is open.

Energization of the magnetic locks 20 and 21 is effected in the present instance by auxiliary switch contacts controlled in accordance with the operating positions of the voltage regulator and oil circuit breakers. One group of auxiliary contacts, namely the contacts designated $a$ and $b$, is controlled as indicated in accordance with the positions of the current interrupting bridging members of the oil circuit breakers. The contacts $a$ are open when the corresponding circuit breaker is open and the contacts $b$ are closed when the corresponding breaker is open.

Another group of auxiliary contacts designated $a'$ is controlled in accordance with the operating positions of the oil circuit breakers with respect to the circuit to be controlled. As illustrated, the auxiliary contacts $a'$ are closed when the corresponding circuit breaker is elevated to its operating position and the circuit breaker coacting plug and socket disconnecting contacts $d$ are in engagement. Another auxiliary switch $a''$ is controlled in accordance with the operating position of the voltage regulator. The auxiliary switch $a''$ is closed when the regulator is moved to its neutral or non-regulating position.

Assuming now that it is desired to transfer the feeder circuit from the regulator position shown to the transfer bus position, it will be apparent that the circuit including the energizing coil of the magnetic lock 21 must be energized from the control bus so as to swing the blocking crank 24 to a non-blocking position before this can be accomplished. As previously explained, the prerequisites for this operation are that the three oil circuit breakers must be closed and in their operating positions and the voltage regulator must be in its neutral position. The circuit breakers are shown in such positions and upon movement of the voltage regulator to its neutral position, thereby closing the auxiliary switch $a''$, the magnetic lock 21 is energized from the control bus through the auxiliary contacts $a$, $a'$ and $a''$. It will be noted that the magnetic lock 20 is still deenergized, thereby preventing opening of the selector switch under load.

The operating shaft 8 may now be rotated in clockwise direction causing corresponding rotation of the selector switch member 2. The selector switch member 2 engages the transfer bus contact 5 while still in engagement with the main bus contact 4, thereby transferring the feeder circuit to the transfer bus without arcing at the selector switch and without dropping the feeder load. When in the transfer bus position, the selector switch member 2 is in engagement only with the contact 5 as best illustrated in Fig. 2. The feeder main oil circuit breaker and the voltage regulator may now be taken out of service for inspection or repair, such procedure, of course, effecting opening at least of the auxiliary contacts $a'$, thereby deenergizing the magnetic lock 21 and causing the blocking crank 24 to swing into blocking position above the pin 19'. Transfer of the feeder circuit back to the main bus and regulator position requires that the feeder main oil circuit breaker and voltage regulator be in the same operating positions as in the above described transfer.

When the feeder is deenergized the transfer from the main bus to the transfer bus position requires only that the feeder and bus-tie oil circuit breakers be open. In these positions, the auxiliary switch contacts $b$ of the feeder breaker and bus-tie breaker are closed so that the magnetic block 21 is energized from the control bus solely through the auxiliary contacts b. It will be noted in this connection also that the auxiliary contacts b of the feeder breaker when closed energize the magnetic lock 20, thereby unblocking the pin 18' and permitting rotation of the selector switch to its open position. Such operation is proper since the feeder main circuit breaker is open and the feeder deenergized. The return of the selector switch to the main bus position is prevented in the event that the feeder circuit breaker is inadvertently closed prior to operation of the selector switch. Such improper operation of the feeder breaker causes opening of the auxiliary contacts b and deenergization of the magnetic lock 20, in turn causing the blocking lug 26 to swing underneath the pin 18'. It shall be understood that the above described control of the magnetic locks by auxiliary contacts responsive to the operating positions of the oil circuit breakers and other apparatus may be varied to suit the particular operating requirements of the station.

Under certain conditions it is desirable to ground the feeder circuit after it has been deenergized. To this end there are provided ground switch actuating means for grounding the feeder and means for interlocking said actuating means with the selector switch so as to preclude closing of the grounding switch when the selector switch is in other than its open position. The contacts 6 and 7 of the ground switch are engaged by vertical movement of a supporting frame 27 on which the socket contact 7 suitably connected to ground is mounted. The frame 27 is guided for vertical movement, as by a channel member 28 at each end thereof, and is actuated by an operating linkage 29. The linkage 29 comprises a manually actuated handle 30 pivoted as at 31 and connected to the frame 27 by means of an intermediate lever 32 centrally pivoted as at 33 and connected at one end through a link 34 to the frame 27 and at its other end through a toggle linkage 35 to the handle 30 at 36. The toggle linkage 35 is in sliding engagement with a fixed pivot pin 37 for causing rotation of the lever 32. Upon rotation of the handle 30 the frame 27 is elevated or lowered, as the case may be, to effect closing or opening of the ground switch contacts.

The interlocking means between the ground switch and the selector switch comprises a manually actuated slide 38 coacting with a bar 39 operatively connected to the selector switch and a bar 40 operatively connected to the ground switch. The bar 39 is connected to the free end of a lever arm 41 pivoted as at 42, the arm 41 having a lost motion connection with the shaft 8 comprising a pin 43 which is secured to the end of an arm 44 on the shaft 8, operating within an arcuate slot 45 in the arm 41. The shape of the slot 45 with respect to the circular path of the pin 43 is such that the pin rides freely in the slot without causing rotation of the arm 41 when the selector switch is in either the regulator or transfer bus position. When, however, the selector switch is moved to its open position, the corresponding counter-clockwise rotation of the shaft 8 causes the pin 43 to lift the arm 41 so as to elevate the interlocking bar 39.

The manually actuated slide 38 is arranged so as to prevent operation of the ground switch and the selector switch at the same time. To this end, one of the interlocking bars, as bar 39, is freely operable through an aperture 46 in the slide, whereas in that position of the slide the bar 40 is blocked with respect to upward movement as clearly illustrated in Fig. 1. In this position the selector switch may be operated and the ground switch is locked in its open position. When, however, the selector switch is moved to its open position as above explained, the bar 39 is elevated so as to clear the slide 38, thereby permitting shifting of the slide so that the aperture 46 is in alignment with the bar 40. The ground switch may now be closed, the selector switch being open, and the selector switch is in turn locked in its open position until the ground switch has again been opened. When the ground switch is open, lowering of the bar 40 permits shifting of the slide 38 back to the position illustrated so that the bar 39 is free to move downwardly in accordance with the operation of the selector switch.

Fig. 2 illustrates a metal enclosed selector switch and transfer bus unit which may be incorporated in a bus and switch station of the metal enclosed or so-called metal clad type. The selector switch and transfer bus unit may be suitably connected to the other units of the station by cables or other suitable forms of conductors.

Referring more particularly to Fig. 2, the unit comprises a metallic housing 50 composed of fabricated sheet metal secured to a frame for example, the housing being divided by a partition 51 into an upper compartment in which the selector switching means 1 is disposed and a lower compartment in which the ground switch apparatus is disposed. The selector switch compartment in the present instance is preferably oil filled for the purpose of insulating the conductors therein, it, of course, being understood that the choice of oil or air insulation is determined by the operating voltage and other considerations.

The housing 50 includes a lower door 52 for permitting access to the ground switch compartment. Since it is desirable that access to the ground switch be prevented except when the selector switch is in its open position, the door 52 is interlocked with respect to the selector switch. To this end the bar 39, which extends through and beyond the manually actuated blocking slide 38 when the selector switch is in either the main-bus or transfer bus position, blocks opening of the door at 53 when the bar 39 is in the aforesaid position. When the selector switch is open, the bar 39 is elevated as previously described and the door 52 may be opened.

The magnetic locks 20 and 21 and the blocking structure immediately associated therewith are mounted within a housing 54 positioned above the selector switch compartment. The front of the housing 4 is provided with an arcuate extension 55 through which the operating arms 13 and 14 are actuated. As best illustrated in Fig. 3, the arcuate portion 55 is provided with a pair of slots 13' and 14' arranged to register with the paths of the operating arms 13 and 14, respectively. Each of the operating arms 13 and 14 is formed at its outer end as a socket so that it may be actuated by a coacting detachable handle 56. For the purpose of insuring rotation of each of the operating arms through a complete operation, the handle 56 is provided with an offset portion 57 to which is secured the coacting plug element for engaging an operating arm and the slots are enlarged at the opposite ends thereof as illustrated so that the detachable handle may be inserted or withdrawn only at the ends of the slot which represent the initial and final positions of a single operation.

The use of a pair of slots coacting with a pair of operating arms necessitates more deliberate action on the part of the attendant, since successive operations of the selector switch necessitate removal of the operating handle from one slot and insertion of the same in the other slot at a position diagonally opposite to the position last reached. For example, in Fig. 3 the apparatus is in the transfer bus position shown in Fig. 2. The operating arm 13 may be engaged through the slot 13' by the handle 56, the operating arm 14 being covered by the housing front 55 and therefore inaccessible. Rotation of the arm 13 to the lower part of the slot moves the selector switch to the main bus-regulator position. The arm 14 is now in alignment with the upper portion of the slot 14' and may be engaged by the handle 56 so as further to move the selector switch to its open position.

The transfer bus-bars 59 are suitably mounted within an oil filled bus-bar housing 60 likewise mounted on top of the housing 50, the connection to the selector switch compartment comprising a conductor bushing 61 suitably mounted in the upper wall of said compartment. The circuit from the transfer bus-bars to the outgoing feeder cable 62 includes the transfer bus contact 5 which is carried by an insulator 63 secured to the housing 50 and is connected by conductor 64 to the lower end of the conductor stud extending through the insulating bushing 61. The selector switch member 2 is mounted on an insulated conductor stud 65 extending through the partition 51 and terminating in the ground switch contact 6 as previously described. The aforesaid conductor stud is connected through a conductor 66, insulated conductor stud 67 and connection 68 to the outgoing feeder cable 62.

The main bus contact 4 is likewise mounted on an insulator 69 and is connected by conductor 70 and through a lead-in bushing 71 to a current transformer 72 mounted exteriorly of the selector switch compartment. The current transformer is in turn connected through conductor 73, insulated conductor stud 74 and connection 75 to the outgoing cable 76 leading to the voltage regulator and to the main bus unit. The portions of the circuit including the current transformer 72 and the cable connections 68 and 75 may likewise be insulated by oil filling the corresponding compartments formed therefor by the housing 50. A potential transformer compartment may also be provided by a housing 77 mounted on top of the housing 50, the connections to the potential transformer and associated apparatus being from the current transformer terminal of the bushing 71.

The ground connection for the movable contact 7 of the ground switch comprises a flexible conductor 78 interconnecting the contacts 7 and a terminal 79 mounted on an insulating panel 80. The other terminal 81 is grounded to the metallic frame of the unit by conductor 82, the terminals 79 and 81 being interconnected by a conducting link 83 which may be removed, if desired, for the purpose of using the terminals 79 and 81 as testing terminals.

Further detailed description of the selector switch and transfer bus metal enclosed unit is believed to be unnecessary since the apparatus incorporated in the unit has been quite fully explained in connection with Fig. 1.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. Electrical switch gear including a selector switch arranged selectively to connect a feeder circuit to a main or transfer bus and to disconnect said feeder with respect thereto, and operating means for said selector switch comprising a rotatable shaft, a pair of operating arms secured to said shaft and angularly spaced with respect to each other, means operatively connecting said shaft to said selector switch, an enclosing housing for said shaft and operating arms, said housing having slots arranged individually to register with said operating arms, and an operating bar for selectively coacting with each of said operating arms through said slots, each slot limiting movement of said operating bar to a range corresponding to a single operation of said selector switch.

2. Electrical switch gear including a selector switch aranged selectively to connect a feeder circuit to a main or transfer bus and to disconnect said feeder with respect thereto, and operating means for said selector switch comprising a rotatable shaft, a pair of operating arms secured to said shaft and angularly spaced with respect to each other, means operatively connecting said shaft to said selector switch, a housing for said shaft and operating arms having a pair of slots arranged individually to register with said operating arms, and an operating bar for selectively engaging each of said operating arms through the corresponding slot in said housing, said operating bar and slots being so correlated that withdrawal or insertion of the operating bar may take place only at the opposite ends of a slot, the relation of said slots to said operating arms being such that coaction between said operating arms and operating bar is confined to a predetermined order of operation of said selector switch.

3. Electrical switch gear comprising a selector switch operable to a plurality of positions, operating and interlocking means for said selector switch comprising a rotatable shaft, a pair of arms secured to said shaft, a pivotally mounted blocking member arranged to coact with each arm so as to block movement thereof in one direction when the selector switch is in one position and to block movement thereof in the opposite direction when the selector switch is in another position, and means for swinging said blocking member out of the path of said arm permitting operation of said selector switch.

4. Electrical switch gear comprising a selector switch operable to a plurality of positions, operating and interlocking means for said selector switch comprising a rotatable shaft, a pair of arms secured to said shaft and angularly spaced with respect to each other, a blocking member coacting with each arm arranged to block movement of said arm in one direction when the selector switch is in one position, to block movement of said arm in the opposite direction when said selector switch is in another position, and electromagnetic means for individually controlling each of said blocking members and for moving the same out of the path of said arms for permitting predetermined operation of said selector switch.

5. Electrical switch gear comprising a selector switch for transferring a feeder circuit to a main or transfer bus and for disconnecting said feeder circuit with respect thereto, means for grounding said feeder circuit, and mechanical interlocking means between said selector switch and grounding means for preventing grounding of said feeder when said selector switch is in other than its open position comprising a manually operated blocking member for permitting but a predetermined sequence of operation of said selector switch and grounding means.

6. Electrical switch gear comprising a selector switch operable to a plurality of positions, a second switch, and interlocking means for insuring predetermined sequence of operation of said switches comprising a bar operatively connected to said selector switch, a second bar operatively connected to said second switch, and a manually actuated blocking member through an aperture of which one of said bars may move without obstruction coincident with the blocking of the other bar by said member.

7. Electrical switch gear comprising a metal enclosed unit containing a selector switch operable to a plurality of positions to connect a feeder circuit to a main or transfer bus and to disconnect said feeder circuit with respect thereto, a switch for grounding said feeder circuit, a door forming part of said unit permitting access to said ground switch, and interlocking means comprising a bar having a lost motion connection with said selector switch, said bar remaining in a position blocking opening of said door when said selector switch is in other than its disconnecting position, a second bar coacting with said ground switch, and a manually actuated blocking plate having apertures arranged so that but one of said bars may extend through an alined opening for a given position of said blocking plate, said plate blocking opening of said ground switch when said selector switch is in other than its disconnecting position and blocking movement of said selector switch when said ground switch is in its open position.

8. Electrical switch gear comprising a metal enclosed unit having a compartment containing a selector switch for connecting a feeder circuit to a main or transfer bus and for disconnecting said feeder circuit with respect thereto, a switch for grounding said feeder circuit disposed in another compartment of said unit, a door for permitting access to said ground switch compartment, and mechanical interlocking means operatively connected to said selector switch for blocking opening of said door when said selector switch is in other than its disconnecting position.

9. Electrical switch gear comprising a selector switch arranged to connect a feeder circuit to a main or transfer bus and to disconnect said feeder circuit with respect thereto, a switch for grounding said feeder circuit, a housing for said ground switch having a door permitting access thereto, and mechanical interlocking means including a bar operatively connected to said selector switch positioned so as to block opening of said door when said selector switch is in other than its disconnecting position.

10. Electrical switch gear comprising a selector switch for a feeder circuit, a switch for grounding said feeder circuit, a housing for said grounding switch having a door permitting access thereto, and mechanical interlocking means including a bar having a lost motion connection with said selector switch arranged so that said bar is in a position blocking opening of said door when said selector switch is in a position other than its disconnecting position.

ROBERT PAXTON.